March 15, 1938. H. G. HAMMAR Re. 20,671
LAMP SUPPORT
Original Filed Jan. 2, 1934
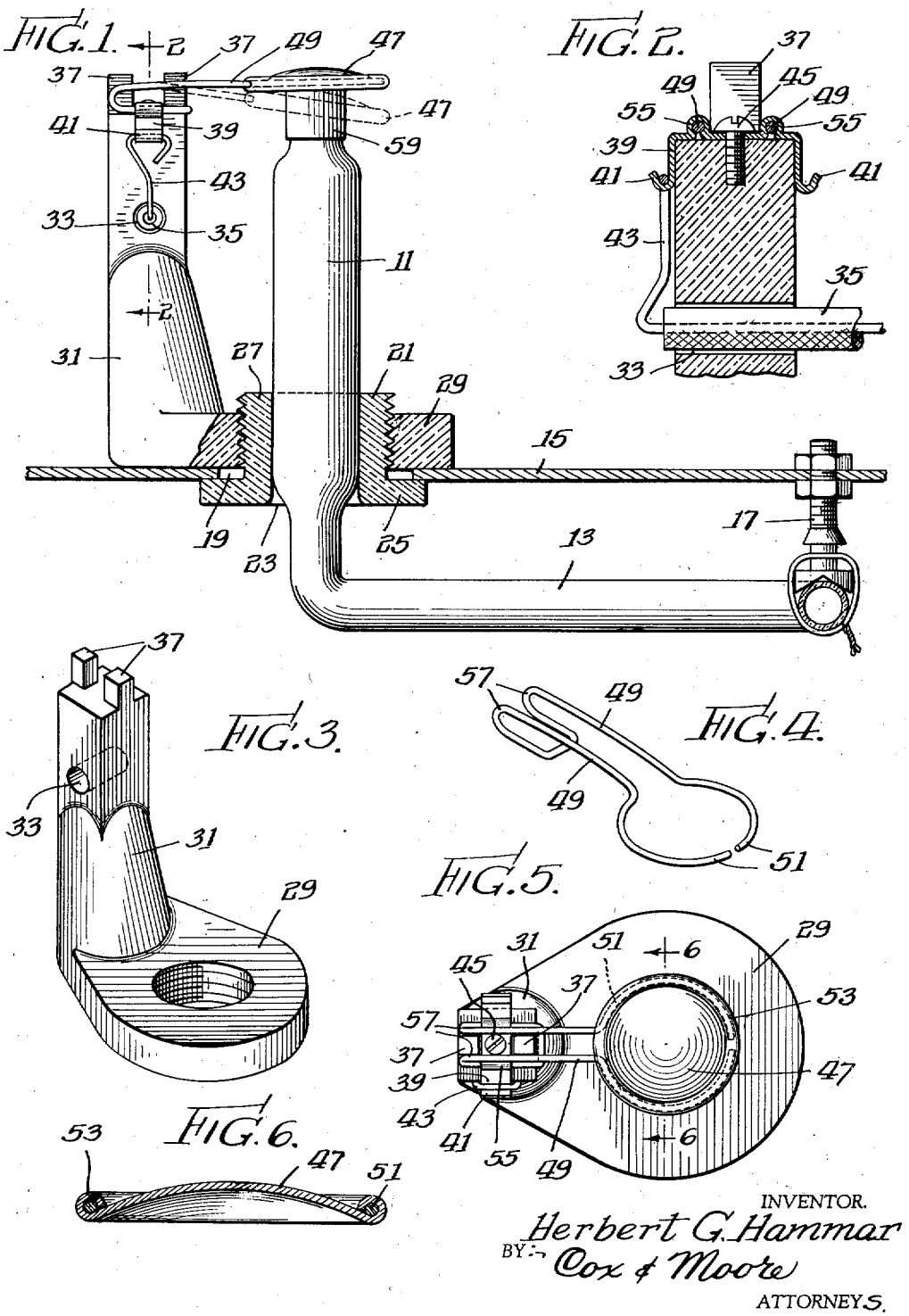
INVENTOR.
Herbert G. Hammar
BY: Cox & Moore
ATTORNEYS.

Reissued Mar. 15, 1938 Re. 20,671

UNITED STATES PATENT OFFICE 20,671

LAMP SUPPORT

Herbert G. Hammar, Chicago, Ill., assignor to Federal Electric Company, Chicago, Ill., a corporation of New York Original No. 2,020,886, dated November 12, 1935, Serial No. 704,907, January 2, 1934. Application for reissue November 12, 1937, Serial No. 174,261

15 Claims. (Cl. 173—328)

My invention relates in general to holders and has more particular reference to a receptacle for receiving and supporting luminescent discharge devices while connecting the same in an electrical circuit, the device of my present invention being especially adapted for supporting luminescent discharge tubes upon suitable support panels.

Discharge devices of this general character are usually made in tubular form of relatively fragile material and are mounted for display upon supporting panels, the ends of the tubular elements being bent and passed through openings in the panel to permit attachment in an electrical circuit rearwardly of the panel, and it is an important object of my present invention to provide a support for carrying the end of the discharge device at a point where it extends through the panel including simple and inexpensive means for connecting the end of the device in an electrical circuit behind the panel.

Another important object is to provide a support of simple and inexpensive construction, easy to apply on a perforated panel and facilitating the connection of the supported device in an external electrical circuit.

Another important object is to provide a bushing for supporting a device extending through a panel, said bushing having an extension carrying a yielding contact in alignment with the bushing and in position to make yielding contact with a device inserted through said bushing, a further object being to form the yielding contact in an inexpensive manner whereby to reduce production costs.

Numerous other objects and advantages will be apparent from the following description, which, taken in connection with the accompanying drawing, discloses a preferred embodiment of the invention.

Referring to the drawing:

Figure 1 is a sectional view taken through a panel carrying a luminescent discharge element supported in a receptacle or holder embodying my present invention;

Figure 2 is a sectional view taken substantially along the line 2—2 in Figure 1;

Figure 3 is a perspective view showing a part of my improved support;

Figure 4 is a perspective view of a resilient electrode mounting forming a part of the device shown in Figure 1;

Figure 5 is a perspective view of the device shown in Figure 1 viewed from the rear of the panel; and Figure 6 is a sectional view taken substantially along the line 6—6 in Figure 5.

To illustrate my invention, I have shown on the drawing, a support for receiving and supporting the end 11 of a luminescent discharge tube 13 mounted on a panel 15. The portion of the tube 13 in front of the panel is carried on one or more saddles 17 of suitable form adapted to be mounted on the panel and extend forwardly thereof to support the discharge element in spaced position in front of the panel. The bent end of the discharge device extends through a suitable opening 19 formed in the panel in order to permit said end to be concealed behind the panel and there connected in an external electrical circuit furnishing power for operating the device.

In order to support the end of the tube in the opening 19, I provide mounting means having cooperating portions whereby to clamp the mounting means at the panel opening 19, the mounting means including portions extending in the opening and providing a bushing for snugly receiving the end 11 of the discharge device. The mounting means also provides a pedestal or support, offset with respect to the bushing and extending rearwardly in position to carry a contact yieldingly in position axially aligned with respect to the bushing to engage and make electrical contact with the end 11 of the discharge device when the same is positioned in the bushing. To this end I may provide a bushing 21 having a central bore 23 adapted to snugly receive the end 11 of the discharge device and having a flange 25 at the forward end of the bushing wide enough to overlie and close the opening 19 around the tube end.

The bushing may, of course, be formed in any suitable or convenient fashion on or for connection on the pedestal element, and the clamping means likewise may have any suitable or convenient form. I prefer, however, to arrange the bushing as a cooperating clamping element to aid in securing the mounting means on the panel, and to this end the bushing 21 preferably has an externally threaded cylindrical portion 27 extending rearwardly of the flange 25 through the opening 19 in position to thread into an internally threaded perforation formed at the base 29 of a pedestal 31 in a preferably integral fashion. When the bushing 21 is threaded into the portion 29, the pedestal 31 may be secured on the panel 15 in position extending rearwardly thereof, the panel being clamped by and between the clamp portion 29 and the flange 25 of the bushing 21.

My invention, however, is not necessarily restricted to the specific arrangement of parts forming the bushing, the pedestal, and the clamp, as shown in the accompanying drawing illustrating a preferred embodiment, but the parts may be arranged in any convenient manner so long as they provide for securing the mounting means on the panel at the opening 19 and provide also, when mounted, a bushing in cooperative relationship with an offset pedestal carrying the contact element preferably yieldingly in axial alignment with the bushing.

In practice, it is difficult to form the discharge element 13 with its bent end accurately aligned with the axis of the opening 19 and in order to afford substantial tolerance to accommodate for the eccentricity of the bent end 11 with respect to the perforation 19, the cylindrical portion 27 of the bushing is preferably formed with an external diameter substantially less than the diameter of the perforation 19, while the flange 25 projects outwardly of the external surface of the bushing a distance equal to at least twice the difference between the external diameter of the cylindrical portion 27 and the diameter of the perforation 19 so that the flange will completely cover the perforation 19 no matter how great the eccentricity of the axis of the tube end with respect to the center of the perforation 19.

The pedestal 31 has an opening 33 adapted to snugly receive a cable 35 forming a part of the external electrical circuit with which the end of the discharge device is connected. The upper end of the pedestal 31 contains a pair of spaced horns 37 projecting beyond the upper end of the pedestal. A preferably metallic conducting strip 39 is fastened across the upper end of the pedestal 31 between the horns 37, the opposite ends of the strip being bent downwardly along the opposed sides of the pedestal end. The end edges of the strip are curled as at 41 to crimpingly receive the bared end 43 of the cable 35. The strip 39 is or may be fastened to the end of the pedestal in any suitable fashion as by means of the fastening screw 45 and serves to support a contact member 47 yieldingly in coaxial alignment with the channel 23 of the device-supporting bushing. The contact 47 comprises a preferably circular dished plate of suitable conducting material which is yieldably supported from the pedestal 31 and electrically connected with the conductor strip 39 preferably by means of a resilient mounting comprising a wire of resilient conducting material formed substantially as shown in Figure 4 of the drawing, the wire being bent at its midpoint to form a pair of substantially parallel arms 49, the ends 51 of which are bent to substantially semicircular configuration and crimpingly received in the curled edge 53 of the plate 47.

The central portions of the wire 49 are secured electrically and mechanically to the strip 39, the strip being preferably crimped as at 55 onto the spaced arms 49 near the central portions of the wire. The arms 49 are also preferably bent as at 57 to improve the yielding character of the mounting. It will be obvious that the contact, the resilient mounting, and the strip 39 may be formed and assembled as a unit and mounted as such upon the pedestal 31 simply by applying the holding screw 45. It will be noted also that the arms 49 extend on opposite sides of the horns 37 of the pedestal and that the horns extend substantially above the resilient mounting wire in order to protect the same against mechanical damage. The resilient mounting is formed to normally support the contact 47 in the dotted position shown in Figure 1. When the end 11 of the discharge device is inserted through the channel 23 of the bushing 21, its ferruled tip 59 will engage the contact 47 and force it to the full line position illustrated in Figure 1, thus forming an electrical connection between the ferrule 59 and the electrical conductor 43.

Obviously, the present invention is not necessarily restricted to the specific construction and arrangement of the contact 47 and its resilient mounting, but any suitable or convenient means for providing a contact yieldingly mounted on the pedestal in axial alignment with the bushing may be employed.

The bushing 21 and pedestal 31 may be formed of porcelain, lava, moldable materials such as the reaction product of phenol and formaldehyde, and other suitable non-conducting materials. The pedestal and bushing, moreover, may be formed as cheap molded elements while the electrode 47, its resilient mounting, and the connector strip 39 are also inexpensive to make.

The device is rugged and may be assembled easily on a panel by unskilled operators, since it is necessary only to crimp one curled edge 41 of the strip 39 upon the bared end of the conductor 43 in order to complete the electrical circuit for powering the support device 13.

It will be noted also that the opening 33 snugly receives the insulated coated portion of the cable 35 so that no further cable anchorage is necessary.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages, the forms herein described being preferred embodiments for the purpose of illustrating my invention.

Having thus described my invention, what I claim as new and desire to secure by Letters Patent is as follows:

1. A mounting for supporting a discharge element on a perforated panel, comprising a pedestal, means to support an element in and secure the pedestal on a panel, contact means carried by said pedestal in position to engage the supported element, said contact means comprising a plate, a resilient mounting for said plate comprising a pair of electrical conducting members crimpingly secured to said plate, and a strip of electrical conducting material crimpingly secured to the conducting members at a point remote from said plate, means to secure said strip upon said pedestal, said strip being formed with curled portions for receiving and forming electrical contact with a conductor of an external electrical circuit, said pedestal having an end projection extending between and beyond said conducting members to protect the same against damage.

2. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel.

3. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, said pedestal being provided with a channel for snugly receiving and supporting a cable conductor, a contact, and means to support the contact from said pedestal in axial alignment with said bushing and in position to engage and support an electrical contact with a discharge element supported in said bushing when the parts are mounted on a panel, said means serving to provide electrical connection between said contact and a cable conductor supported in said channel.

4. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, said pedestal being provided with a channel extending in a non-radial direction with respect to the axis of the bushing, said channel being adapted for the removable reception of a cable conductor, a contact, and means on said pedestal and operatively connected with said contact to support same in position and to provide electrical connection between said contact and a cable conductor supported in said channel.

5. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, said pedestal being provided with a channel for the reception of a cable conductor, a contact, and resilient means on said pedestal and operatively connected with the contact to yieldingly support the same from the pedestal in position to make electrical contact with a discharge device mounted in the bushing, said resilient means also serving to provide electrical connection between said contact and a cable conductor supported in said channel.

6. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, means to mount the contact on the pedestal comprising a resilient conductor element secured to the contact and extending substantially radially therefrom to the pedestal, said resilient conductor being secured to the pedestal whereby the flexibility of the radially extending conductor element provides for yieldingly supporting the contact from the pedestal.

7. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, and means for mounting the contact on the pedestal comprising a resilient conductor element looped substantially at its mid-portion and having spaced arms secured to the contact and extending therefrom to the pedestal and the element being secured to the pedestal substantially at its looped portion.

8. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, means for mounting the contact on the pedestal comprising a resilient conductor element looped substantially at its mid-portion and having spaced arms secured to the contact and extending therefrom to the pedestal and the element being secured to the pedestal substantially at its looped portion, each arm of said resilient element being curled intermediate the looped portion and the contact to increase their yielding support action.

9. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, the end of the pedestal being provided with spaced, upstanding horns and the means for mounting the contact on the pedestal comprising an element connected to the contact and extending to and secured to the pedestal between said upstanding horns.

10. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, the end of the pedestal being provided with spaced, upstanding horns and the means for mounting the contact on the pedestal comprising a connector secured to the contact and having a pair of arms extending on opposite sides of said horns and secured to the pedestal.

11. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, the end of the pedestal being provided with spaced upstanding horns and means for mounting the contact on the pedestal comprising a connector secured to the contact and having a pair of arms extending on opposite sides of the horns and a portion interconnecting said arms and extending between said horns and secured to the pedestal.

12. A mounting for use in combination with a discharge device and a support panel comprising a pair of cooperating elements having portions formed for threaded engagement and adapted for mounting on the panel and including an element forming a support provided with an opening and an outwardly projecting flange, and a cooperating clamp element having projecting portions whereby to clampingly receive the panel between said flange and said projecting portions of the clamp when the elements are threaded together in order to support the elements on the panel, one of said elements having an offset portion forming a pedestal adapted to extend outwardly of said panel in position offset with respect to said opening when said elements are in mounted position on the panel, a yielding contact and means to mount the contact on the pedestal in axial alignment with said opening when the cooperating elements are in mounted position on the panel so that a discharge element inserted in said opening may be snugly supported in position engaging the axially aligned contact.

13. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, yielding means comprising a contact and means to mount the same on the pedestal in axial alignment with said bushing, and in position to engage and form electrical contact with a discharge element supported by said bushing when the cooperating elements are in mounted position on the panel.

14. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, said contact being of yielding character permitting movement thereof in the direction of the axis of said bushing as the discharge element is inserted in said bushing and arranged in mounted position therein.

15. A mounting for supporting a discharge element on a panel comprising a pair of cooperating elements, at least one of which comprises a bushing, said elements having interfitting parts whereby said elements may be connected together and mounted on a panel with the bushing in position to receive and support a discharge element, one of said elements forming a pedestal on the panel in position to extend in offset relationship with respect to the axis of the bushing, a contact and means to mount the same on the pedestal in axial alignment with said bushing, and in position to engage and form electrical contact with a discharge element supported by said bushing when the cooperating elements are in mounted position on the panel, said contact being of yielding character permitting movement thereof in the direction of the axis of said bushing as the discharge element is inserted in said bushing and arranged in mounted position therein, and means for securing the discharge element against movement from mounted position in said bushing under the urge of said yielding contact.

HERBERT G. HAMMAR.